UNITED STATES PATENT OFFICE.

WILLIAM HORLICK, OF RACINE, WISCONSIN.

MALTED FOOD PRODUCT AND METHOD OF MAKING SAME.

SPECIFICATION forming part of Letters Patent No. 627,119, dated June 20, 1899.

Application filed June 3, 1897. Serial No. 639,254. (No specimens.)

*To all whom it may concern:*

Be it known that I, WILLIAM HORLICK, a citizen of the United States, and a resident of Racine, in the county of Racine and State of Wisconsin, have invented certain new and useful Improvements in Food Products; and I do hereby declare that the following is a full, clear, and exact description thereof.

The object of my present invention is the production of a new and useful food product combining the nutritive qualities of malt, wheat, and beef, together with chocolate and cocoa, when desired, in such manner as to retain the natural flavors of said ingredients and to render the product both palatable and readily digestible, as well as easily prepared for use, all as will be fully set forth hereinafter and subsequently claimed.

In the preparation of my said new food product I proceed as follows: I take a convenient amount—say one hundred pounds—of good malt, made from choice barley, and crush the same, adding sufficient cold water—say about two hundred quarts—to bring the whole to the consistence of a thin paste, and heat the mass in an open vessel at a temperature from 120° to 150° Fahrenheit for from one to two hours, and then filter off the liquid, which I term the "wort," about one hundred and seventy-five quarts of this filtrate being thus obtained. I next take, say, one hundred pounds of whole wheat and crush the same and add enough cold water—say about two hundred quarts—to form a thin paste, and heat the mass in an open vessel for from one to two hours at a temperature from 160° to 190° Fahrenheit, and then filter off the liquid, which I term the "wheat extract," obtaining about one hundred and eighty quarts of this filtrate therefrom, the wheat being a trifle less absorbent than the malt. Thirdly, I take, say, one hundred pounds of prime lean beef and mince the same into very fine particles and add sufficient water—say about one hundred and twenty-five quarts—to bring the whole into the consistence of a thin mass. To this mass I add about one-half ounce of pepsin and sufficient hydrochloric acid (from two to three fluid ounces) to render the mixture faintly acid and subject the mass, in an open vessel, to a temperature not to exceed 125° Fahrenheit for from two to three hours and filter off the liquid, which I term the "beef extract," about one hundred and twenty-five quarts of this filtrate being thus obtained. I next mix these three filtrates together in a vacuum-pan and add from twenty to thirty ounces of a mixture of equal parts of bicarbonate of potash and bicarbonate of soda and from ten to fifteen ounces of chloride of sodium, (and if a chocolate or cocoa flavor is desired I add from five to ten pounds of either chocolate or cocoa in a powdered state,) and then evaporate the whole with thorough mixing to a dry state *in vacuo* at a temperature not exceeding 140° Fahrenheit, and then granulate or pulverize the product, which is now ready for use and is preferably put up in glass jars or other suitably-sealed or tightly-closed packages. Owing to the differences in temperature and time required to obtain these several above-mentioned extracts in their best and strongest form it is obvious that I could not obtain the same results by mixing the various ingredients together before dissolving or heating the same. With the malt it is necessary to use such a temperature as will best serve to extract the diastase without damaging it or lowering its activity as a ferment. Incidentally, also, this temperature and time must be regulated to best extract the other soluble nutritive elements of the malt. With the wheat the described high temperature is necessary in order to gelatinize the starch therein contained, and thus render it readily soluble and hence easy to filter. In addition the gelatinized or soluble starch is also better prepared to be acted upon by the diastase of the malt extract, and so the operation is made more rapid and thorough. In preparing the beef extract it is desirable to employ a low temperature to avoid coagulating or rendering less soluble the albuminoids of the beef and to thoroughly extract all the soluble constituents thereof, and in order to allow the thorough maceration of the beef and its peptonizing by the pepsin at the aforesaid necessary low temperature it is requisite that it be exposed to heat for from two to three hours, as stated. By my described method of first obtaining separately these several extracts of malt, wheat, and beef and then allowing them to act upon each other in a proper vessel at a suitable temperature I obtain the following advantages, viz: The filtered liquid containing the diastase of the malt is obtained and presented for action in its pure form without any admixture of inert or partially-inert matter, and in a similar manner the soluble and most readily digestible parts of the beef and of the wheat are also presented free from any accompanying inert and comparatively valueless constituents. In this way I obtain the best and fullest action of the diastase upon the other ingredients and so obtain a perfectly soluble and readily-digestible food. Still further, by my method of acting upon the beef with both pepsin and diastase the pepsin, acting in a faintly-acid medium, digests or converts into peptones so much of the beef as can be so attacked, and then the diastase is presented to the mixture, and in this way the vegetable ferment or enzyme therein contained still further carries on and completes the work at a proper temperature, and by this double action I thoroughly predigest the constituents of the beef.

By my described treatment of the whole wheat I obtain and present in this food product the valuable carbohydrates derived from the conversion of the starch, also the albuminoids and the phosphates and other mineral salts of the wheat, and by the salts added to the mixture in the vacuum-pan I obtain a flavor, better preserve the various constituents, and assist in digestion and assimilation and also furnish a certain amount of mineral matter for the system. While it is not absolutely essential that I should add the chocolate or cocoa, the same possess valuable nutritive qualities and render my product more palatable.

Having thus described my invention, what I claim as new, and desire to secure by Letters Patent, is—

1. A dry food product, composed of the extracts of malt, whole wheat and peptonized beef, combined together with the addition of suitable mineral salts, substantially as set forth.

2. In the hereinbefore-described method of preparing a food product, the process of obtaining a beef extract, consisting in first mincing the beef into fine particles, subjecting the same to the action of pepsin in an acid solution to convert a portion of said beef into peptones, and then adding a malt extract to complete the work of digestion by the action of the vegetable ferment of the malt under proper conditions of time and temperature, substantially as set forth.

3. The herein-described method of preparing a food product, consisting in taking substantially equal quantities of malt, whole wheat and beef, and obtaining separate liquid extracts of each, and filtering the same; mixing said filtrates together and adding mineral salts thereto, and then evaporating the same to a dry state, *in vacuo*, at a temperature not exceeding 140° Fahrenheit, and granulating or pulverizing the same, substantially as set forth.

4. The herein-described method of preparing a food product consisting in taking a given quantity of malt, crushing the same, and adding enough water to form a thin paste and then heating the mass in an open vessel at a temperature of from 120° to 150° Fahrenheit for from one to two hours, and filtering off the liquid; next, taking a given quantity of whole wheat, crushing the same, and adding enough water to form a thin paste, and heating this mass in an open vessel at a temperature of from 160° to 190° Fahrenheit for from one to two hours, and filtering off the liquid; next, taking a given quantity of prime lean beef, mincing the same into very fine particles, and adding enough water to form a thin mass together with a small quantity of pepsin and enough hydrochloric acid to render the mass faintly acid, and subjecting the mass to a temperature not exceeding 125° Fahrenheit, for from two to three hours, and filtering off the liquid; then, mixing the said three filtrates together, adding mineral salts thereto, and evaporating the mixture *in vacuo*, to a dry state, at a temperature not exceeding 140° Fahrenheit, and granulating or pulverizing the resulting product, substantially as set forth.

In testimony that I claim the foregoing I have hereunto set my hand, at Racine, in the county of Racine and State of Wisconsin, in the presence of two witnesses.

WILLIAM HORLICK.

Witnesses:
WARREN W. SCOTT,
WM. HORLICK, Jr.